INVENTOR.
LEONARD D. SOUBIER
BY Charles A. Lynch
and
W. A. Schaich
ATTORNEYS

INVENTOR.
LEONARD D. SOUBIER
BY Charles A. Lynch
and
W. A. Schaich
ATTORNEYS

INVENTOR.
LEONARD D. SOUBIER
BY Charles A. Lynch
and
W. A. Schaich
ATTORNEYS

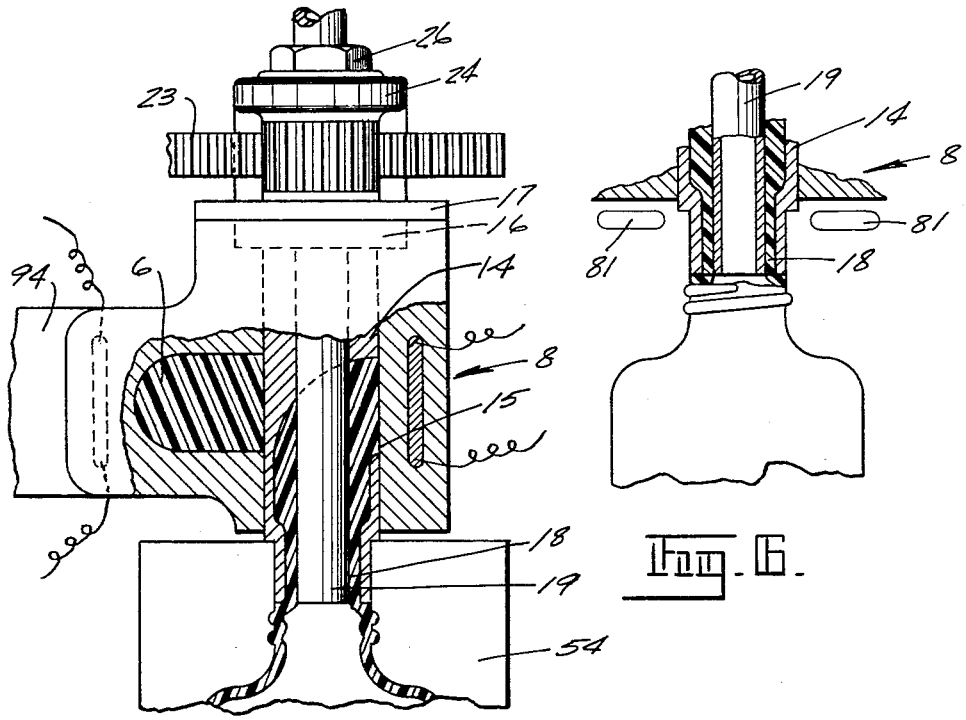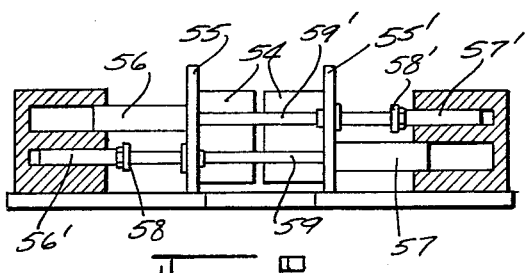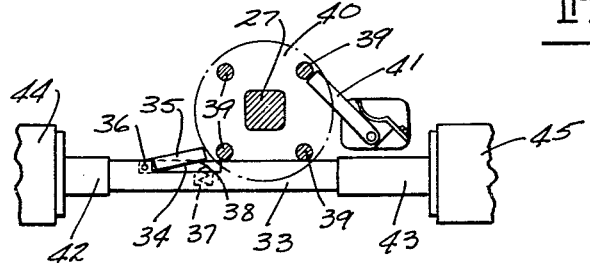

United States Patent Office 3,000,052
Patented Sept. 19, 1961

1

3,000,052
METHOD AND APPARATUS FOR FORMING
HOLLOW ARTICLES
Leonard D. Soubier, Toledo, Ohio, assignor to Owens-Illinois Glass Company, a corporation of Ohio
Filed Nov. 3, 1959, Ser. No. 850,612
12 Claims. (Cl. 18—5)

It is already known to blow bottles and other hollow articles from organic plastic materials commonly known as "thermoplastics," by extruding the heated material in expandable condition through an annular extrusion orifice to form a tube of the plastic material, and, after the end of the tube has been closed, to enclose the tube in a mold and then blow the tube to conform with the interior of a surrounding mold cavity.

In an effort to increase the production rate of this type of machine, there have been machines developed wherein the output of an extruder is alternately shuttled between a plurality of extrusion orifices so that the blown articles may be blown at one or more of such orifices while tubing is being extruded from other of such orifices. U.S. Patent No. 2,724,860 to Strong illustrates a machine operating on this general principle.

While this machine arrangement results in increased productivity, heretofore it has been accomplished only with a sacrifice of quality and uniformity of the blown articles produced. This necessarily results from the fact that the arrangements heretofore provided for supplying the heated thermoplastic material alternately or successively to a plurality of extrusion orifices have always resulted in a portion of the thermoplastic material lying dormant in the conduits leading to any particular discharge orifice during the time that an article is being blown at such orifice. As is well known in this art, many types of thermoplastic materials are subject to serious and rapid deterioration when permitted to lie dormant under fluctuating temperature conditions, and every blown article produced on the prior art machines of this type was fabricated at least in part from thermoplastic material which had to lie dormant in a conduit for the length of time required to blow and cool the preceding article.

Accordingly, it is an object of this invention to provide an improved method and apparatus for the manufacture of blown plastic articles which enables high production rates to be obtained without any sacrifice in quality or uniformity of the successive articles. In particular, it is an object of this invention to provide an improved method and apparatus for distributing heated thermoplastic material from the output end of an extruder to a plurality of successively operating discharge orifices, characterized by the fact that no substantial portion of the heated thermoplastic material is permitted to lie dormant in the distributing conduits.

Still another object of this invention is to provide an improved method and apparatus for successively or alternately supplying a plurality of discharge orifices with heated thermoplastic material while concurrently maintaining an active recirculation of the heated thermoplastic material from the output end of the extruder back to an extruder inlet spaced rearwardly of the output end.

The present invention is particularly adaptable to a machine of the type wherein a single extruder feeds heated thermoplastic material to a plurality of discharge heads in timed sequence. In this way, one or more plastic articles may be in the process of being blown and cooled within their respective molds while, simultaneously, tubing is being extruded from other heads. In accordance with this invention, heated thermoplastic material is continuously extruded into a generally annular conduit and then returned to the extrusion screw at a medial point

2 thereof. Pressure is continuously maintained on the thermoplastic material thus the thermoplastic material is kept constantly in motion. A plurality of discharge orifices is selectively connectable to the conduit depending upon the desired sequence of extrusion of the tubing through the orifices. The chamber containing the feed screw is provided with an electrical resistance-type heating means and the annular conduit is likewise provided with electrical resistance-type heaters. The electrical heaters for the annular conduit are individually controlled so as to provide selective heating along the flow path of the plastic. Such selective heating of the conduit further insures that the plastic remains in its flowable form without deteriorating.

The specific nature of this invention, as well as other objects and advantages thereof, will become apparent to those skilled in the art from the following detailed description thereof taken in conjunction with the annexed sheets of drawings in which, by way of example only, is illustrated one embodiment of this invention.

FIG. 5 is a vertical cross-sectional view, similar to FIG. 4, of the discharge head, in which the head has been rotated approximately 180°.

FIG. 6 is a vertical view of the neck portion of a completed article showing the article still connected to the extrusion nozzle.

FIG. 7 is a plan view of the mechanism for advancing the machine to its different positions.

FIG. 8 is a side view of the mold operating mechanism.

Figure 1:
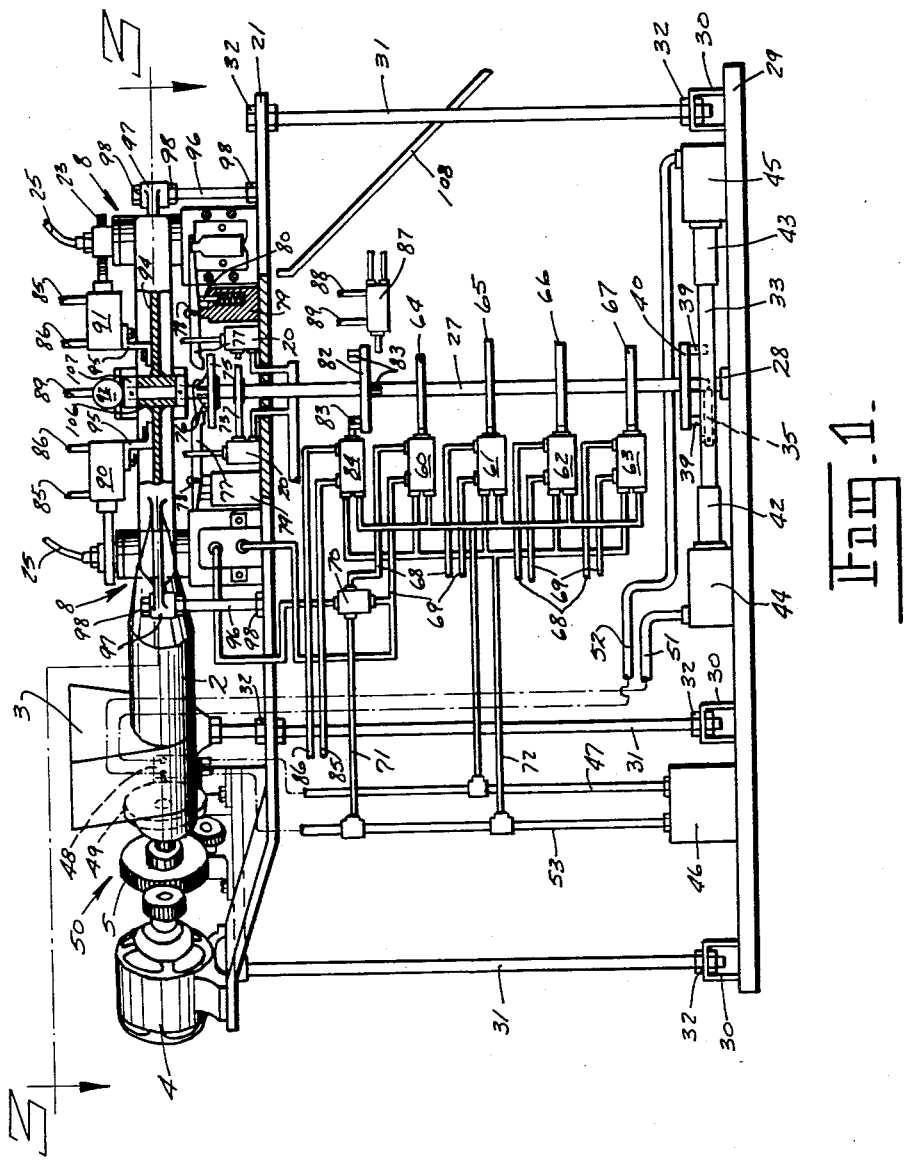
FIG. 1 shows diagrammatically a side elevational view of the machine, partly in section, and with some of the components removed for clarity.

The machine illustrated in the drawings comprises four discharge heads 8 arranged so that plastic material under pressure may be selectively extruded vertically downward from the heads either in turn or in any selected manner. The invention is, however, applicable to any machine having one or more intermittently operating discharge orifices. The extrusion pressure is created in a known manner by a rotating plasticizing screw 1 arranged in a heated chamber 2, to which comminuted plastic material is fed from a hopper 3. The screw is driven by means of a motor 4 through suitable gearing 5. The heated plastic material is extruded from the chamber 2 into a heated annular, continuous conduit 6, and flows past the discharge heads 8. Any plastic material that is not extruded from the discharge heads is returned to the screw chamber through a port 13 which communicates a medial portion of the feed screw chamber 2 with a straight portion 7 of conduit 6, and is then recirculated.

Pressure on thermoplastic material within the continuous conduit 6 is continuously maintained through the utilization of a biased valving piston 9 slidable in the straight portion 7 of conduit 6 and overriding port 13. Piston 9 is connected by a link 10 to a fluid motor 11. Air under pressure is supplied to the fluid motor 11 through a conduit 12 with a conduit 12' serving as an exhaust passage from the fluid motor 11. The force applied to piston 9 and consequently the pressure which is maintained in the continuous conduit 6 may be selected by adjusting the pressure of the fluid supplied through conduit 12 to fluid motor 11. As the pressure builds up within the conduit 6, above that which is desired, the piston 9 will move toward the left, as viewed in FIG. 3, and uncover more of the port 13 thus allowing the pressure within the conduit 6 to fall and become substantially constant. The conduit 6 is generally horizontal and a plurality of downwardly directed extrusion nozzles or discharge heads 8 are directly connected thereto and adapted to extrude plastic tubing in a downward direction. The extrusion nozzles 8 are located at spaced points 90° apart about the annular conduit 6.

Figure 4:
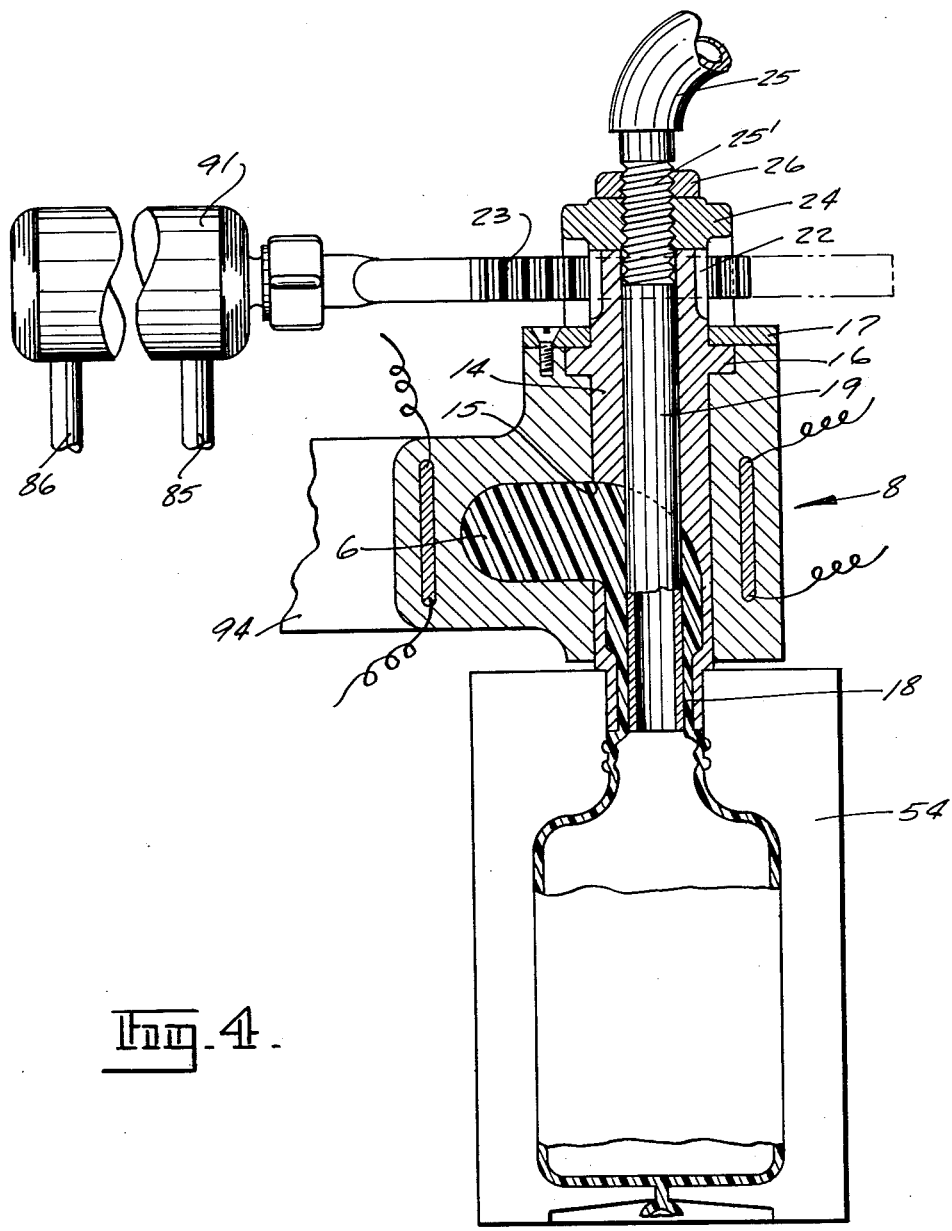
FIG. 4 is an elevational view partly in section showing the details of one discharge head and its associated operating mechanism.

The discharge heads 8 take the form of rotatable annular sleeves 14. The sleeves 14 extend vertically through the walls of the annular continuous conduit and are mounted in said walls for rotational movement. Each sleeve 14 has an annular shoulder at the upper end thereof which seats in a circular recess in the top wall of the continuous conduit. Each sleeve is open at the bottom and has a radial port 15 in the side wall thereof above the open end, which communicates with the thermoplastic material flowing through the continuous conduit 6 when positioned, for example as shown in FIG. 4. Rotation of the sleeve 14 will disconnect the radial port 15 from the thermoplastic material flowing in the continuous conduit 6, for example as shown in FIG. 5. The annular shoulder 16 of sleeve 14 is held against axial movement by an annular retaining plate 17 which is fastened to the top of the conduit 6 by means of suitable fastening means. The annular retaining plate 17 also has an internally threaded portion 24 which extends above the top of sleeve 14. An elongated tubing, or blow pipe 19, having an externally threaded portion 25' adjacent the upper end thereof, extends down through the sleeve 14 coaxially therewith, and is threaded in the threaded portion 24 of the retaining plate 17. A lock nut 26 is threaded on the end 25 of the pipe 19 to prevent accidental rotation of pipe 19 relative to sleeve 14. The pipe 19 extends downwardly through the sleeve 14 and terminates at approximately the lower extent of the sleeve 14. An annular orifice 18 is thus defined by the space between the sleeve 14 and pipe 19.

The plasticizer 2 and continuous annular conduit 6 are supported horizontally above a table 21 by means of rods 96 which are connected to the table 21 at one end and to support bushings 97 carried by the plasticizer and continuous annular conduit 6 at the other end. In this position the discharge heads are arranged to deliver thermoplastic tubing in a vertically downward direction. One of a plurality of conduits 25 is connected to the upper end of each tube 19. Fluid under pressure is delivered to the conduits 25 through the intermediary of control valves 20 mounted on table 21. The control valves 20 are actuated in a preselected sequence by a cam 73 fixed to a vertical rotatable shaft 27. The upper end of sleeve 14 is provided with a plurality of gear teeth 22 around its periphery, with which a rack 23 is in engagement. Actuation of the rack will result in rotation of the sleeve, for example from the position shown in FIG. 4 to the position shown in FIG. 5.

A vertical shaft 27 extends through a central aperture in the table 21 and has its lower end carried in a bearing 28 which in turn is carried by the base 29 of the machine frame. The base 29 also carries support brackets 30 of inverted channel form from which the table 21 is supported by four threaded rods 31 disposed respectively adjacent the corners of the table. By adjusting the nuts 32 on the threaded rod 31, the height of the table can be adjusted.

The shaft 27 is rotated in step by step fashion by means of a feed mechanism and in such manner that in each feeding step the shaft 27 will be turned 90°.

The feed mechanism for turning the shaft 27 comprises a reciprocating member 33, of rectangular cross-section, in one edge of which is cut a recess 34 which accommodates a feed finger 35 pivoted to the member 33 at 36. Within an aperture 37 drilled in the side wall of the recess 34 is located a spring 38 which urges the feed finger out of the recess to the position shown in FIG. 7, a stop (not shown) being provided for preventing further outward movement of the feed finger 35 beyond the position shown.

Figures 2, 3:
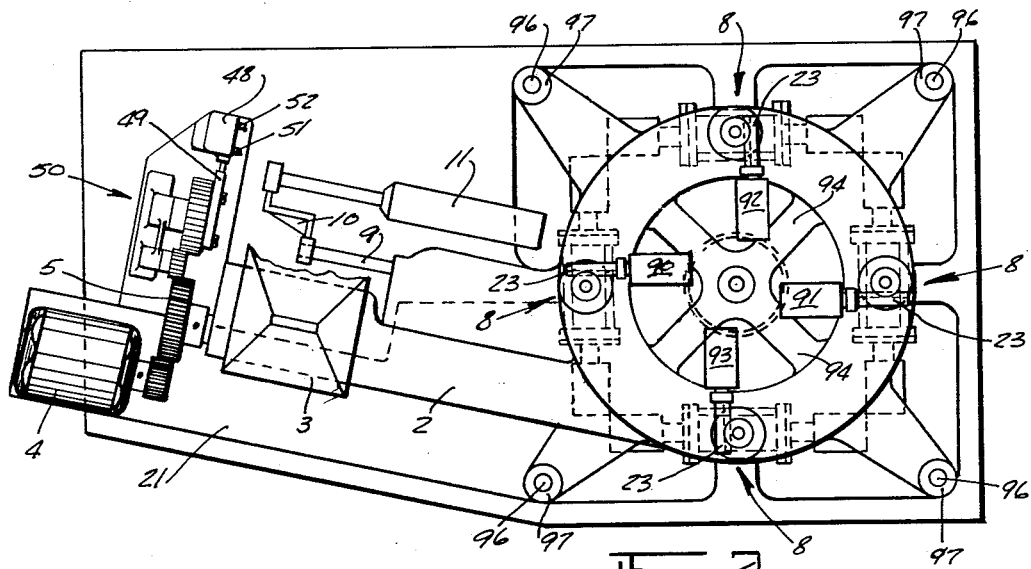
FIG. 2 shows a plan view of the machine of FIG. 1.
FIG. 3 is a cross-sectional view taken along the line 3—3 of FIG. 1.

When the reciprocating member 33 is in its extreme left-hand position as shown in FIG. 3, the feed finger 35 lies adjacent one of four pegs 39 projecting from a disc 40 fixed to the shaft 27. Movement of the reciprocating member 33 toward the right will cause the end of the feed finger 35 to engage with the adjacent peg 39 to rotate the shaft 27. The movement of the member 33 is limited so that the shaft 27 will be rotated through a quarter of a turn at each movement toward the right of the member 33. During its return movement toward the left, the feed finger 35 is moved into the recess 34, against the spring 38, as it moves past the peg 39 which has advanced to the position previously occupied by the peg which was engaged by the feed finger on its preceding stroke toward the right. Return movement of the disc 40 during this return movement of the reciprocating member 33 is prevented by the spring-pressed latch 41 which engages behind one of the pegs 39 as shown in the drawing. When the member 33 is moved to its extreme left-hand position, the feed finger 35 is again moved out by the spring 38 to engage with the adjacent peg 39 during the next advancing movement of the member 33 toward the right.

The reciprocation of the member 33 is effected hydraulically by two plungers 42, 43 arranged in the cylinders 44, 45 and acting respectively to move the member 33 in opposite directions when hydraulic pressure is applied alternately to the two cylinders 44, 45. The hydraulic pressure is generated by an oil pump 46 and associated sump, the pressure side of the pump being connected by a pipe 47 to an oil control valve 48 controlling the operating cycle of the machine. This control valve is actuated by a cam 49 driven from the gear 5 through a gear train 50 of which the gear ratio can be adjusted or changed to alter the time cycle of the machine. The oil control valve 48 is movable to two positions in which the oil pressure in the pipe 47 is connected respectively to either the cylinder 44 or cylinder 45 through pipes 51, 52 respectively, that one of the pipes 51, 52 which is not connected to the oil pressure pipe 47 being connected by the valve 48 to the exhaust pipe 53 so that the oil discharged from a cylinder will be exhausted into the sump of the pump 46. The cam 49 is provided with a step so that the control member of the valve 48 will suddenly move to the position in which oil is fed to the cylinder 44 for advancing the shaft 27 so that the shaft is advanced suddenly. The return movement of the member 33 is effected more gradually as the control member of the valve 48 is gradually moved to its other position when rising up the cam surface.

Carried by the table 21 beneath the nozzles 8 are the four molds and the associated opening and closing mechanism. The molds are preferably two-part molds comprising the two parts 54 carried respectively by platens 55, 55' which may be moved toward and away from one another to close and open the mold. The molds are water cooled in known manner (not shown) and are detachable from the platens so that different molds may be used. The platens are actuated by two pairs of hydraulic rams 56, 56', 57, 57', the rams 56 and 57 serving for closing the mold and being of larger diameter than the rams 56', 57' which serve for opening the mold. The outer ends of the rams 56 and 57 are directly connected to their adjacent platens while the outer ends of the rams 56', 57' are connected respectively to cross-members 58, 58' interconnecting the ends of pairs of guide rods 59, 59', the opposite ends of which are secured to the platens 55, 55' respectively. The rods 59, 59' are freely movable through apertures in the platens 55, 55' respectively. The pairs of rods 59, 59' thus serve to guide the alignment of the platens 55, 55' and when pressure is applied to the rams 56', 57' the platens will be moved in a direction to open the mold.

The supply of oil pressure for opening and closing the four molds is controlled by four oil control valves 60, 61, 62, and 63, the operation of these valves being controlled by cams 64, 65, 66, and 67, respectively, all of which are fixed on the shaft 27. The cams have two engaging surfaces 180° apart. Thus for each 360° rotation of shaft 27, each cam will engage its respective control valve twice. Each control valve is connected to the oil supply pipes 47, the outer pipes 68 being connected to the two cylinders of the large diameter rams 56 and 57 of the corresponding mold operating assembly and the outlet pipes 69 to the two cylinders of the two small diameter rams 56' and 57', only the pipes 68, 69 leading from the valve 60 are shown connected to the mold mechanism; the pipes from the other valves have not been shown in full in order to simplify the drawing. Each of the pipes 68 is connected to its corresponding pair of cylinders through a check valve 70 which maintains the pressure in these cylinders to hold the mold parts firmly closed until the corresponding oil control valve is actuated to open the mold. This avoids any possibility of the molds opening slightly with variations in the pressure in the oil supply line. Each check valve 70 is so constructed that it is released and allows the oil in the associated large diameter cylinders to exhaust through the pipe 71 to the pipe 53 when pressure is applied through the pipe 69 to open the mold. Oil from the small diameter cylinder is exhausted back to the pipe 53 through pipe 72 connected to the control valve in the usual way. The four cams 64–67 are arranged such that two of the cams are disposed at right angles to the other two cams so that as the shaft 27 is stepped around, the molds, associated with the different nozzles, will open and close successively and in correct order in accordance with the timed operation of the machine.

The shaft 27 also carries a cam 73 similar in shape to cams 64–67, which serves to operate the air control valves 20. The four air control valves 20 corresponding to the four discharge nozzles are disposed around this cam so as to be actuated in the proper sequence. The cam 73 is so positioned with respect to the cams 64–67 controlling the opening and closing the molds, that air will be fed to the inner tubular member 19 of each nozzle only during those periods when the associated mold is closed. The cam timing is preferably such that the air pressure is turned on shortly after the corresponding mold has closed.

Also carried by the shaft 27 is a disc 75 having on its upper surface two wedge-shaped cams 76 adapted to engage with and raise the inner ends of four ejector levers 77 for removing the molded bottles from the nozzles. Each of the levers 77 is individual to one of the discharge heads and each is pivoted at a bearing 78 carried by a block 79 from the table 21. The block 79 also accommodates a spring-pressed plunger 80 for normally urging the inner end of its associated lever 77 toward the disc 75. The outer end of each lever 77 is formed with a forked or annular portion 81 surrounding the nozzle so that, when the inner end of the lever 77 is raised by the cam 76, its portion 81 will move downwardly to remove the molded bottle from the nozzle 18. The cams 76 are so positioned with respect to the other cams on the shaft 27 that a lever 77 will be actuated while the corresponding mold is opened and preferably at the beginning of the stage when the plastic material is extruded through that nozzle. The cam 76 passes beneath and reaches each of the levers during its movement from one position to the next and does not remain in contact with any of the levers when the shaft 27 is stationary in any of its four positions.

As an alternative to separating the bottle from the nozzle by means of the above-described lever actuated arrangement, a severing knife (not shown) mounted adjacent the lower end of each discharge head, may be actuated so as to move across from right to left and sever the finished container from the nozzle after the mold has been opened.

The shaft 27 also carries a disc 82 on which cam blocks 83 are positioned. The cam blocks 83 are positioned near the outer periphery of disc 82 and upon rotation of the disc 82, will actuate control valves 84 and 87 in timed sequence depending upon the rate of rotation of the shaft 27. The control valve 84 has pressure lines 85 and 88 connected thereto. These lines 85 and 88 deliver fluid under pressure to fluid motors 90 and 91. The control valve 87 has pressure lines 86 and 89 connected to the fluid motors 92 and 93. Actuation of valves 84 and 87 results in fluid under pressure being delivered to said motors 90—93 to actuate racks 23 between two positions. One position is shown in heavy lines in FIG. 4, and the second position is illustrated by dotted lines wherein the rack is moved and the sleeve 14 is rotated. The fluid motors 90—93 are mounted above the annular continuous 6 by means of brackets 95. These brackets are attached to a spider 94 which forms not only the support for the fluid motors but also a hub 106 at the center thereof which serves as the upper bearing member for shaft 27. Collars 107 are fixed to shaft 27 above and below the hub by means of set screws or other suitable locking means to prevent the intrusion of foreign material into the bearing surfaces formed between shaft 27 and hub 106.

As previously stated, the plasticizer 2 and conduit 6 are supported above the table 21 by means of rods 96 which are connected to support bushings 97. The vertical position of the plasticizer 2 and conduit 6 with respect to the table 21 may be adjusted by means of the bushings 97 and lock nuts 98 which are threaded on the rods 96. This adjustability is desirable so as to provide the required clearance between the molds 54 and the discharge heads 8.

The plasticizer 2 and annular conduit 6 are heated in sections defined by the space between adjacent discharge heads 8, by means of resistance heater elements 99—103 wherein each heater element surrounds and heats its individual section of the continuous conduit. Each heater element is connected through a rheostat 104 and adjustable wiper 105 to a suitable source of electric current. By providing sectional heating with individual controls for each section, it is possible to adjust the heat distribution throughout the entire length of the recirculation conduit and the plasticizer. Section heating is desirable from the standpoint of maintaining the thermoplastic material at a proper temperature to minimize deterioration thereof and to insure the delivery of thermoplastic material to the discharge heads which consistently has the desired optimum molding characteristics.

In operating the machine, the feed screw 1 is rotated at a desired speed for extruding the thermoplastic material for which purpose the motor 4 is preferably a variable speed motor and the timed sequence of the machine is adjusted by suitable selection of the gear train 50 so that the desired amount of thermoplastic material will be flowing continuously past the discharge heads spaced along the annular continuous conduit. The particular operation of the machine will be described with respect to the extruding of thermoplastic material from two discharge heads at a time, it being understood that one or more heads may be in their extruding position depending upon how the time cycle is chosen. Assuming that thermoplastic material is being extruded from the first and third discharge heads, after the time interval set for the timed cycle, the shaft 27 is rotated through a quarter of a turn to a position to disconnect the first and third discharge heads from the supply of thermoplastic material flowing in the annular continuous conduit, and to connect the second and fourth discharge heads to the supply of thermoplastic material. As the shaft 27 approaches this second position, the cams 64—67 corresponding to the first and third discharge heads actuate its associated oil control valve to close the molds around the lengths of thermoplastic tubing depending from the first and third discharge heads. The open end of the thermoplastic tubing is closed automatically by being gripped between the bottom walls of the two mold parts when the mold is closed. When in this second position the cam 73 also actuates the air supply valves 20 corresponding to the first and third discharge heads to admit the air under pressure through the inner tubing member 19 of said discharge heads and thereby blowing the thermoplastic tubing to conform with the internal configuration of the mold.

While these mold operations are taking place, tubing is being extruded from the second and fourth discharge heads and after the predetermined time set by the timed cycle, the shaft 27 is again rotated through a quarter of a turn to a third position to shut off the supply of thermoplastic material to the second and fourth discharge heads and to connect the first and third discharge heads to said supply of thermoplastic material flowing through conduit 6. The second and fourth molds are then closed around the lengths of tubing depending from the second and fourth discharge heads and the second and fourth articles are blown as above described. It can thus be seen that two hollow thermoplastic articles are formed during each 180° rotation of shaft 27.

After each pair of articles has been expanded in its respective mold, the mold is opened and the article is separated from its discharge head by the actuation of the lever 77 associated therewith. The ejector levers 77 are actuated by the movement of the cams 76 passing under the ends thereof, at approximately the same time that the associated discharge head is again put into communication with the thermoplastic material in the recirculation conduit 6, and extrusion therefrom is started, it being understood that the article will be completely severed from the discharge head before the extrusion of the thermoplastic from the associated head is actually begun. Due to the configuration of the molds, the extruded portion of the tubing is cut either entirely or substantially entirely from the mass of plastic material in the discharge heads when the molds are closed. Thus when the molds are opened the formed article may be easily pulled away from the discharge heads by the levers 77. The formed articles fall through openings 21' in the table 21 directly beneath the discharge heads and may be directed by chutes 108 away from the machine.

As previously stated, the articles may be separated from their respective extrusion heads by the operation of a severing knife moving across the attached portion of the article just below the discharge heads, the severing knife being operated in the same time sequence as the lever 77 is operated.

While a particular embodiment has been described it will be understood that various modifications may be made without departing from the scope of the invention. Thus, for example, instead of forming two articles simultaneously, it is possible by changing the cycle and using the appropriate cam elements, to form one article at a time in sequence. It is also possible to operate the extrusion heads in any selected number or order merely by providing the proper timing arrangement for performing the extruding, molding, blowing, and ejecting steps.

From the foregoing description it is apparent that this invention provides better control of the physical characteristics of the thermoplastic material by virtue of the recirculation of the plastic through the plasticizer 2 and continuous conduit 6. By having short sleeves as extrusion nozzles in the discharge heads, which open directly into the annular conduit 6, better control of the physical characteristics of the plastic that is to be extruded in tube form may be obtained. Furthermore, only a small quantity of thermoplastic material is subject to dormant conditions because of the fact that only a small amount of plastic is retained within the sleeve 14 when the sleeve is rotated to cut off the supply of plastic thereto, and this small quantity may be disposed in the tail portion of the plastic article which is trimmed therefrom.

It will, of course, be understood that various details of construction may be modified throughout a wide range without departing from the principles of this invention and it is not the purpose to limit the patent granted hereon otherwise than necessitated by the scope of the appended claims.

I claim:

1. In a process for manufacturing plastic articles, the improvement comprising heating a supply of thermoplastic material, circulating the heated thermoplastic material through a continuous conduit extending past a plurality of discharge ports and back to said supply, maintaining a working temperature in said circulating material, maintaining a predetermined pressure on said circulating material, and selectively opening and closing said discharge ports in a timed sequence to extrude measured lengths of said material in tubular form, enclosing said lengths in a mold and expanding same to final form.

2. Apparatus for manufacturing plastic articles from a supply of plastic material in which a motor driven plasticizing screw continuously feeds heated thermoplastic material; the improvement comprising a continuous conduit communicating between the discharge end of said screw and a medial portion of said screw, a plurality of discharge ports spaced along said conduit, means for maintaining a predetermined pressure on the thermoplastic in said conduit, and means for opening and closing said discharge ports in a preselected sequence.

3. The apparatus as defined in claim 2, wherein the means for maintaining a predetermined pressure on the thermoplastic in the conduit comprises a piston slidable in a cylinder communicating with said conduit and means for biasing said piston against the thermoplastic in the conduit with a predetermined force.

4. Apparatus for manufacturing plastic articles from a supply of thermoplastic material in which a motor driven plasticizing screw feeds thermoplastic material from the end thereof; the improvement comprising an annular continuous conduit communicating between the end of said screw and a medial portion of said screw, means for maintaining a predetermined pressure on the plastic within said conduit, and a plurality of discharge heads spaced along said conduit, means for heating said conduit in sections defined by the area between adjacent discharge heads, and means for opening and closing said discharge heads in a preselected sequence.

5. The apparatus as defined in claim 4, wherein said heating means comprises a separate heater for each section of said conduit and means for controlling the temperature of each heater individually.

6. The apparatus as defined in claim 5, wherein said heaters are electrical resistance-type heaters electrically connected to a source of current and the means for controlling the temperature of each heater is a rheostat in the electrical connection between said heaters and said source.

7. Apparatus for conditioning and distributing thermoplastic material used in molding plastic articles comprising a horizontal continuous conduit, said continuous conduit being defined by first, second and third intercommunicating portions, a return port intermediate the length of said third portion and communicating with a medial point in the first portion; a rotatable feed screw in said first portion for continuously feeding thermoplastic material through said second portion and into said third portion, plural discharge means constructed and arranged along said second portion for discharging said thermoplastic material, means for maintaining a constant pressure on the flowing thermoplastic material, and means for activating and deactivating said discharge means in a preselected sequence.

8. The apparatus as defined in claim 7, wherein said constant pressure maintaining means comprises a piston, slidably closing said third portion adjacent said return port, and means for biasing said piston in a port closing direction with a constant presettable force.

9. The apparatus as defined in claim 7, further including means for maintaining said material at working temperature in said continuous conduit.

10. The apparatus as defined in claim 7, further including a plurality of individual heaters connected to said second portion in the zones between said plural discharge means.

11. The apparatus as defined in claim 10, wherein said heaters are electrical resistance type heaters electrically connected to a source of current and further including an individually adjustable rheostat in the electrical connection between each heater and said source.

12. In a process for the continuous manufacture of plastic articles, the improvement comprising heating a supply of thermoplastic material, continuously flowing said heated material at a constant rate along a confined path extending past a plurality of spaced molding stations, returning the unused material to the heated supply for reheating, separating a discrete mold charge from said confined path at each said molding station in a preselected timed sequence, maintaining a predetermined elevated pressure on said flowing material, maintaining said flowing material at a working temperature throughout the extent of its flow path and forming said separated mold charges into articles at each said station.

References Cited in the file of this patent

UNITED STATES PATENTS

| | | |
|---|---|---|
| 1,154,674 | Van Ness | Sept. 28, 1915 |
| 2,653,352 | Gliss | Sept. 29, 1953 |
| 2,724,860 | Strong | Nov. 29, 1955 |
| 2,871,516 | Sherman et al. | Feb. 3, 1959 |

FOREIGN PATENTS

| | | |
|---|---|---|
| 767,164 | Great Britain | Jan. 30, 1957 |